United States Patent
Rimboym et al.

(10) Patent No.: US 11,624,456 B2
(45) Date of Patent: Apr. 11, 2023

(54) ANTI-SURGE RECYCLE VALVE

(71) Applicant: VRG Controls, LLC, Lake Zurich, IL (US)

(72) Inventors: Vladimir Rimboym, Highland Park, IL (US); James M. Garvey, Wheaton, IL (US)

(73) Assignee: VRG Controls, LLC, Lake Zurich, IL (US)

( * ) Notice: Subject to any disclaimer, the term of this patent is extended or adjusted under 35 U.S.C. 154(b) by 709 days.

(21) Appl. No.: 16/703,563

(22) Filed: Dec. 4, 2019

(65) Prior Publication Data

US 2020/0182242 A1  Jun. 11, 2020

Related U.S. Application Data

(60) Provisional application No. 62/775,183, filed on Dec. 4, 2018.

(51) Int. Cl.
*G05D 16/20* (2006.01)
*F16K 47/04* (2006.01)
(Continued)

(52) U.S. Cl.
CPC ............ *F16K 47/045* (2013.01); *F04C 14/26* (2013.01); *F04C 14/28* (2013.01);
(Continued)

(58) Field of Classification Search
CPC .......... F04C 14/24; F04C 14/26; F04C 14/28; F04C 28/24; F04C 28/26; F04C 28/28;
(Continued)

(56) References Cited

U.S. PATENT DOCUMENTS 3,814,375 A * 6/1974 Grotloh .................. F16K 31/40
376/277
5,242,263 A * 9/1993 Mondoloni ......... F04D 27/0223
415/28
(Continued)

FOREIGN PATENT DOCUMENTS

DE    202020102558 U1 * 9/2021
EP       2042743 A1 * 4/2009 ............. F04D 25/06

OTHER PUBLICATIONS

VRG Controls, "RCVC Red Circle Valve Controller", Ver 122116 (Year: 2013).*

*Primary Examiner* — Hailey K. Do
(74) *Attorney, Agent, or Firm* — Bishop, Diehl & Lee, Ltd.

(57) ABSTRACT

An anti-surge recycle valve system for a natural gas line using a pipeline rotary control valve for controlling gas flow through the gas line and a valve controller having a surge-programmable feature including a threshold setpoint deviation limit, which is used to control first and second control valve loops. The first solenoid valve loop drives a rotary high-pressure piston actuator when the linear position sensor determines a setpoint deviation in gas flow below the threshold deviation, and the second solenoid valve loop drives the rotary high-pressure piston actuator when the linear position sensor determines a setpoint deviation in gas flow above the threshold deviation. The system provides ultra-rapid stroking speed in tandem with highly accurate and stable positioning.

16 Claims, 15 Drawing Sheets

(51) Int. Cl.
    *F04C 14/28*     (2006.01)
    *F04C 14/26*     (2006.01)
    *F04D 27/02*     (2006.01)
    *F16K 31/10*     (2006.01)

(52) U.S. Cl.
    CPC ..... F04D 27/0215 (2013.01); G05D 16/2097 (2019.01); *F16K 31/105* (2013.01)

(58) Field of Classification Search
    CPC .. F04D 27/02; F04D 27/0207; F04D 27/0215; F04D 27/0223; F04D 27/001; F16K 31/124; F16K 31/1245; F16K 31/128; F15B 2211/31505; F15B 2211/31511; G05D 16/20; G05D 16/2093; G05D 16/2095; G05D 16/2097
    See application file for complete search history.

(56) References Cited

U.S. PATENT DOCUMENTS

| | | | |
|---|---|---|---|
| 5,762,468 A * | 6/1998 | Blotenberg | F04D 27/023 415/26 |
| 9,400,060 B2 * | 7/2016 | Garvey | G05D 16/166 |

* cited by examiner

ANTI-SURGE RECYCLE VALVE

RELATED APPLICATION

The present disclosure claims the filing priority of U.S. Provisional Application No. 62/775,183 titled "ANTI-SURGE RECYCLE VALVE" and filed on Dec. 4, 2018. The '183 application is hereby incorporated by reference.

TECHNICAL FIELD OF THE INVENTION

The present disclosure relates to control valves for fluid systems. More specifically, the disclosure relates to control valves for natural gas systems. Most specifically, the disclosure relates to anti-surge recycle valve systems for natural gas line systems.

BACKGROUND OF THE INVENTION

Compressor stations are an integral part of the natural gas pipeline network that moves natural gas from individual producing well sites to end users. As natural gas moves through a pipeline, distance, friction, and elevation differences slow the movement of the gas, and reduce pressure. Compressor stations are placed strategically within the gathering and transportation pipeline network to help maintain the pressure and flow of gas to market.

The term "surge" in a centrifugal compressor can be simply defined as a situation where a flow reversal from a discharge side back into the compressor casing occurs, typically causing mechanical damage.

The reasons for the occurrence of surges are numerous, ranging from driver failure, power failure, upset process conditions, startup, shutdown, failure of anti-surge mechanisms, check valve failure, operator or, etc. The consequences of a surge are more mechanical in nature whereby ball bearings, seals, thrust bearing, collar shafts, impellers, etc., wear out and sometimes, depending on the power of the surge forces, cause fractures to machinery parts due to excessive vibrations.

The primary protection for a centrifugal compressor is an anti-surge line/valve (ASV). The ASV recycles cold gas from the discharge side cooler back to the suction scrubber to keep the operating point away from the surge line (See FIG. 1).

In today's world no piece of machinery can be said to be protected by modern methods without implementing a control system. A surge can occur in a matter of seconds or sometimes even milliseconds giving almost no time for operators to intervene. Hence, a control system becomes a critical component of the compressor package.

Until the invention of the present application, these and other problems in the prior art went either unnoticed or unsolved by those skilled in the art. The present invention provides an anti-surge recycle valve (ASRV) which performs multiple functions with the associated natural gas system without sacrificing effectiveness or reliability.

SUMMARY OF THE INVENTION

There is disclosed herein an improved valve assembly and controls for a natural gas line which avoids the disadvantages of prior devices while affording additional structural and operating advantages.

Generally speaking, the disclosed anti-surge recycle valve (ASRV) system or a natural gas line comprises a pipeline rotary control valve (PRCV), a rotary high-pressure piston actuator, a valve controller, a linear position sensor, an exhaust booster, a rapid-response solenoid valve, and a pair of standard-response solenoid valves.

The ASRV may also comprise a manual valve override and/or a valve status monitor.

In an embodiment, the anti-surge recycle valve system is for a centrifugal compressor in a fluid delivery line, and the system comprises first and second control loops, wherein the second control loop utilizes an RCVC digital positioner with a surge-programmable feature which allows activation of a high-speed loop (solenoid) to move the valve very rapidly until the difference between an input signal and an output signal falls within an acceptable value, thereby eliminating the need for using a bleed gas in steady state.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
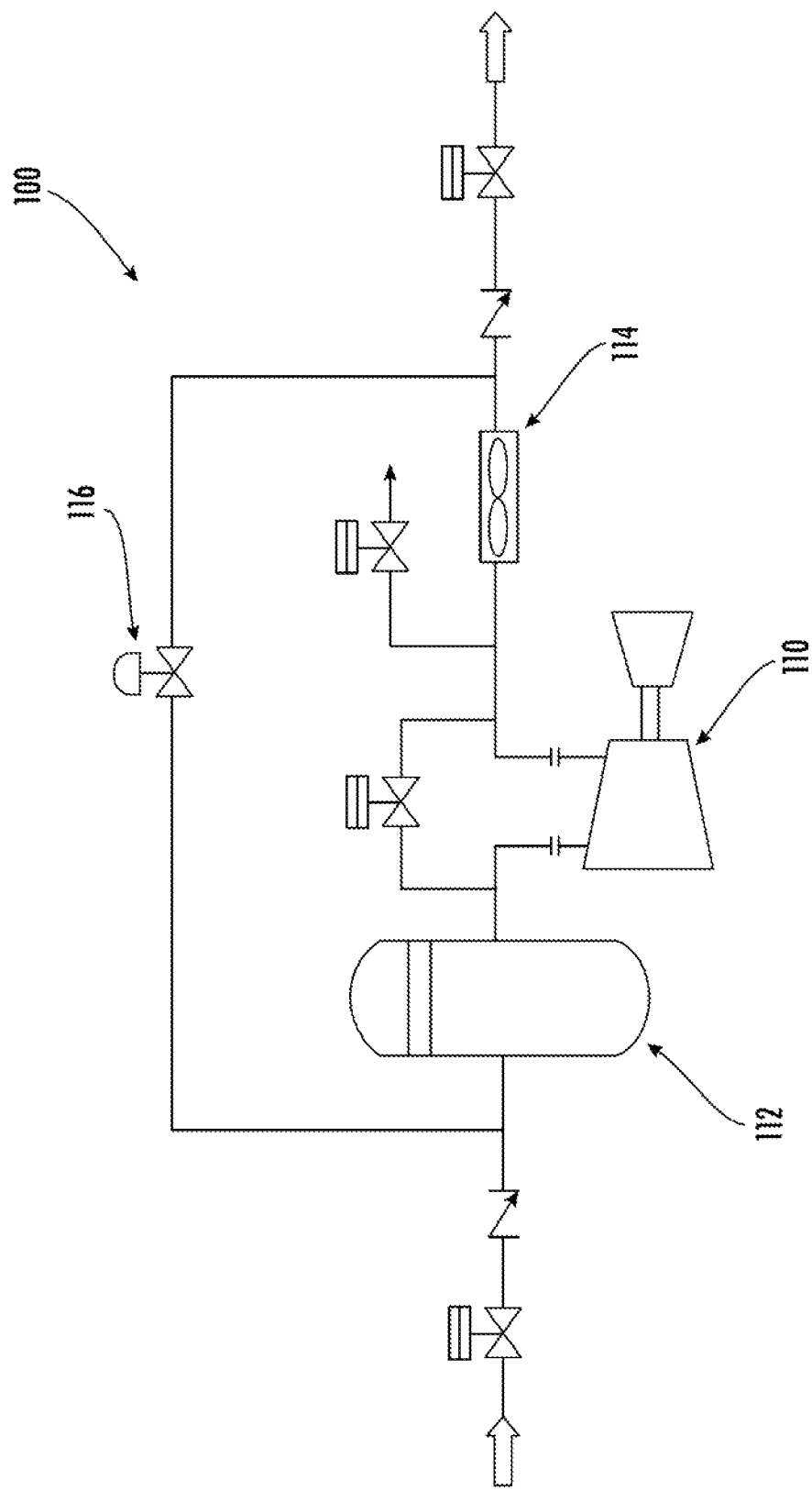
FIG. 1 is a schematic showing a typical centrifugal compressor station with an anti-surge assembly.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Figure 2:
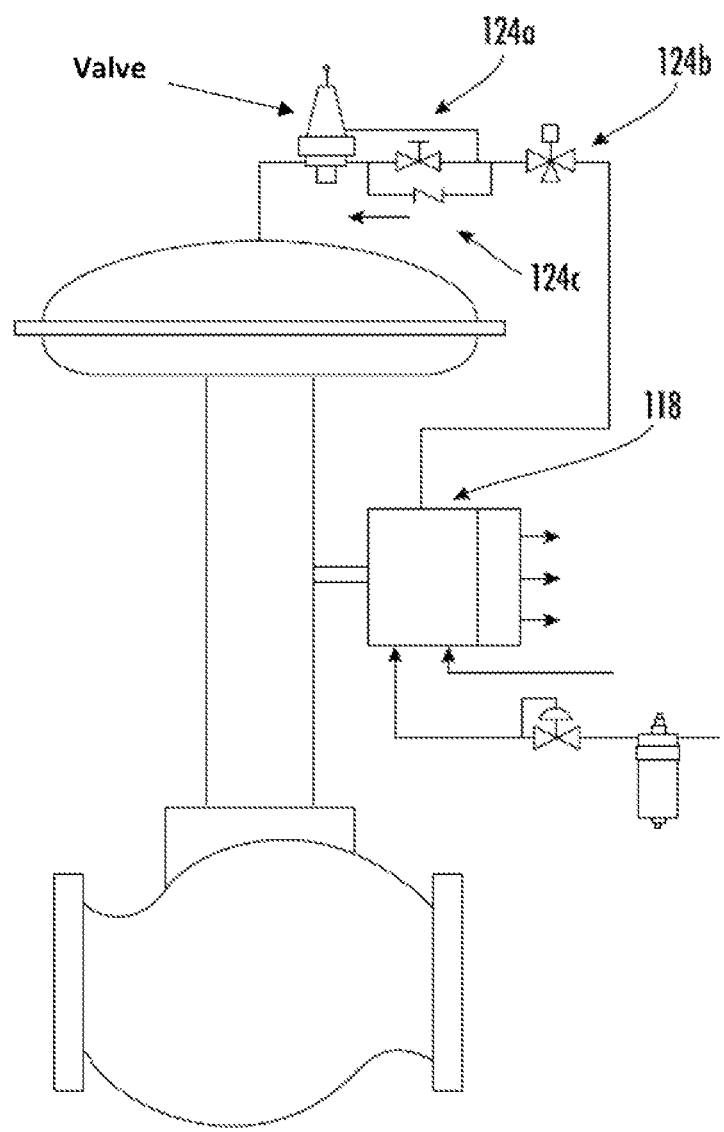
FIG. 2 is a schematic illustrating a prior art single loop anti-surge valve system.

A centrifugal compressor system is used to move natural gas through a pipeline. As can be seen in FIG. 1, such a system 100 typically consist of a compressor 110, a scrubber 112, a cooler 114, and, due to the dynamic flow conditions of the gas line, an anti-surge valve 116. As shown in FIG. 2, current surge control valve assemblies 120 for a centrifugal compressor system 100 use a single-loop or single-mode consisting of an adjustable, electro-pneumatic positioner 122 and a series of exhaust valves 124*a-c*. The electro-pneumatic positioner 118 PID loop is adjusted with a rapid response in order to achieve high-speed in the event an input signal runs away from an output signal. While these systems 100 achieve fast stroking times in "surge situations," they sacrifice precision during lower speed modes, like recycle and start-up. Further, in order to achieve high-speed ability, a heavy bleed gas is introduced in all existing digital positioners (e.g., Fisher DVC and Dresser SVI). The use of a bleed gas equals loss of product (natural gas) and lowers profitability.

For details on operation of a gas line control system, reference is made to U.S. Pat. No. 9,400,060 to Garvey et al., and assigned to VRG Controls, LLC of Highland Park, Ill. The '060 patent is hereby incorporated by reference.

Without intending to limit the scope of the disclosed valve system 10 to any specific embodiment, the following TABLE I is a listing of major components, and respective specifications, for a preferred embodiment of the anti-surge recycle valve assembly 12.

TABLE I

| Component | Model | Voltage | Supply | Type | Other Specs |
|---|---|---|---|---|---|
| Standard Response Solenoid | ASCO EV8327GO52 | 24 VDC | 41-150 psig | 2-position, 3-Way One port plugged | Cv 0.50. low-temp (−40° F.), Stainless Steel Body, Universal, UL CSA CE Approved, Ex Proof Cl. 1 Div. 1., Buna N Elastomers, 0.250 NPT Ports, Tapped Exhauset. One (1) for CLOSE and One (1) for OPEN |
| Rapid Response Solenoid | BIFOLDXS16-16-p20SC2-77U-24D-30-V | 24 VDC | 29-150 psig | 2-position, 2-Way High-Speed | Cv 14, low-temp (−20° F.), Stainless Steel Body, Universal, UL CSA CE Approved Ex Proof Cl. 1 Div. 1, Buna N Elastomers, 1.0 IN FNPT Exhaust Ports (2), 1.0 In FNPT Inlet Ports (1), 0.250 FNPT Ex-Pilot Port (1) |

| Component | Model | Temp. | Supply | Type | Other Specs |
|---|---|---|---|---|---|
| Exhaust Booster | 289RC | −20° to180° F. | 125 psig Max | Exhaust Booster | Cv 22, Inlet/Outlet 1.00 IN FNPT, Signal Port 0.250 FNPT, Body, Cover: Aluminum Die Cast, Valve, O-Rings and Gaskets: NBR |
| Valve Manual Override | VMO-150 | −50° to 200° F. | 150 psig Max | Pneumatic Manual Override | Cv 0.40, 0.250 FNPT Ports Body: Carbon Steel Bolting: 316 SS, Internals: 304 SS O-Rings: Buna-N |

| Component | Model | Type | Limit Switches | Visual Indicator | Other Specs |
|---|---|---|---|---|---|
| Limit Switch Assembly | Westlock 2007X-2-SPDT | Rotary Mechanical or Proximity | SP-DT, DP-DT | Beacon High Visibility Position Indicator | 90 Degree Rotary Limit Switches with High Visibility Beacon Travel Indicator, Area Classification Cl 1 Div 1 Groups C&D/T6, NAMUR Output Shaft, Various Limit Switch Configurations, Powder Coat Aluminum Housing, Available with Optional 4-20 mA Analog Feedback (Passive Use Only) |
| Linear Feedback Module | Balluff BTL7-E501-M0153-J-DEXC-TA12 | Micropulse Linear Position Sensor | N/A | Linear Travel Scale (10% increments) | 4-20 mA Micropulse Transducer, 0.250 FNPT Elec. Connections, UL CSA CE Approved, Ex. Proof Cl. 1 Div 1, Stroke Lengths Available: 4, 6, 8, 12 and "SHORT LENGTH" 2.0 IN or less adjustable, Linear Feedback Mounting Kits available |

Figure 3:
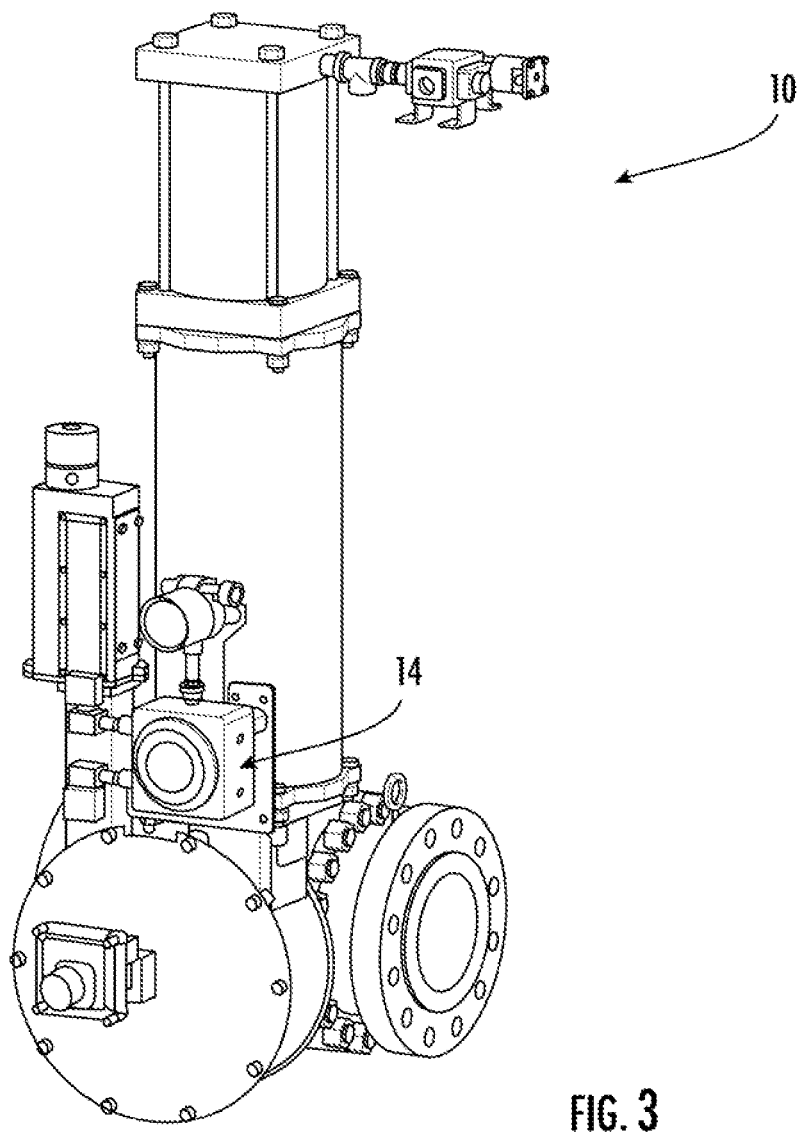
FIG. 3 is a perspective view of an embodiment of a pipeline rotary control valve (PRCV) with an embodiment of the anti-surge recycle valve system of the present invention.
Figure 4:
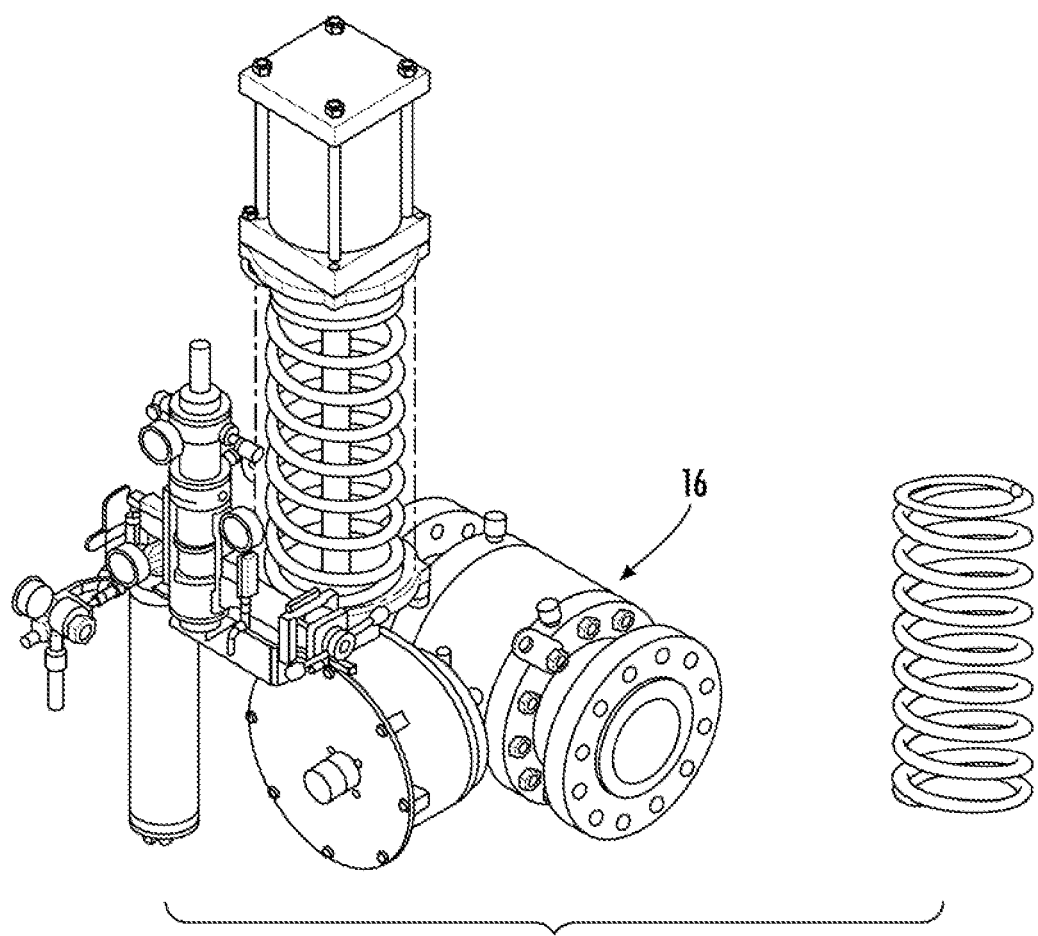
FIG. 4 is a perspective view of the PRCV with a transparent housing for an embodiment of an attached rotary high-pressure actuator.
Figure 5:
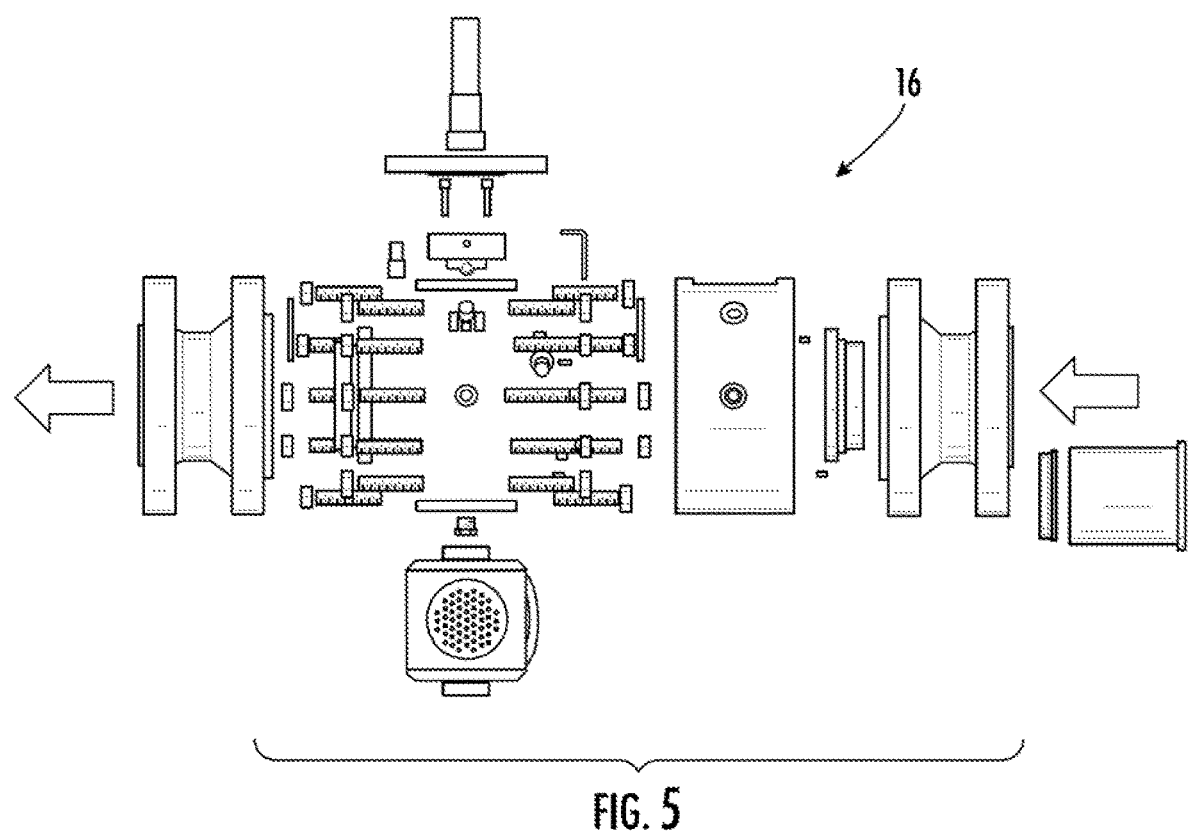
FIG. 5 is an exploded view of an embodiment of the pipeline rotary control valve.
Figure 6B:
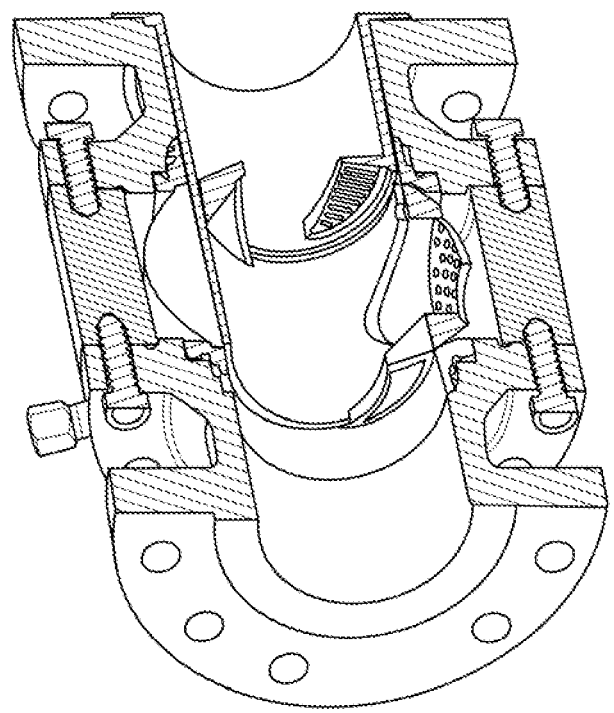
FIG. 6B is a cut-away perspective view of an embodiment of a rotary control valve similar that shown in FIG. 5.
Figure 6A:
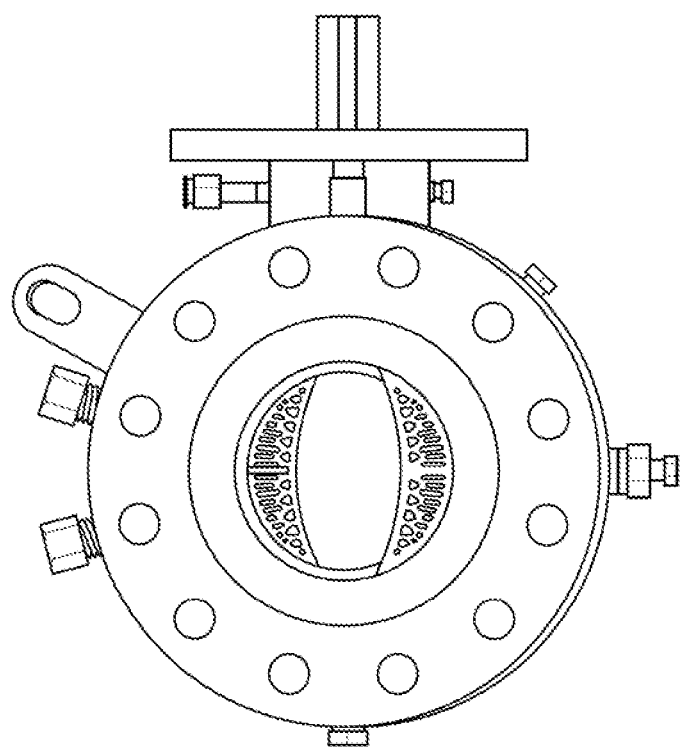
FIG. 6A is a downstream end view of an embodiment of a rotary control valve similar to that shown in FIG. 5.
Figure 7:
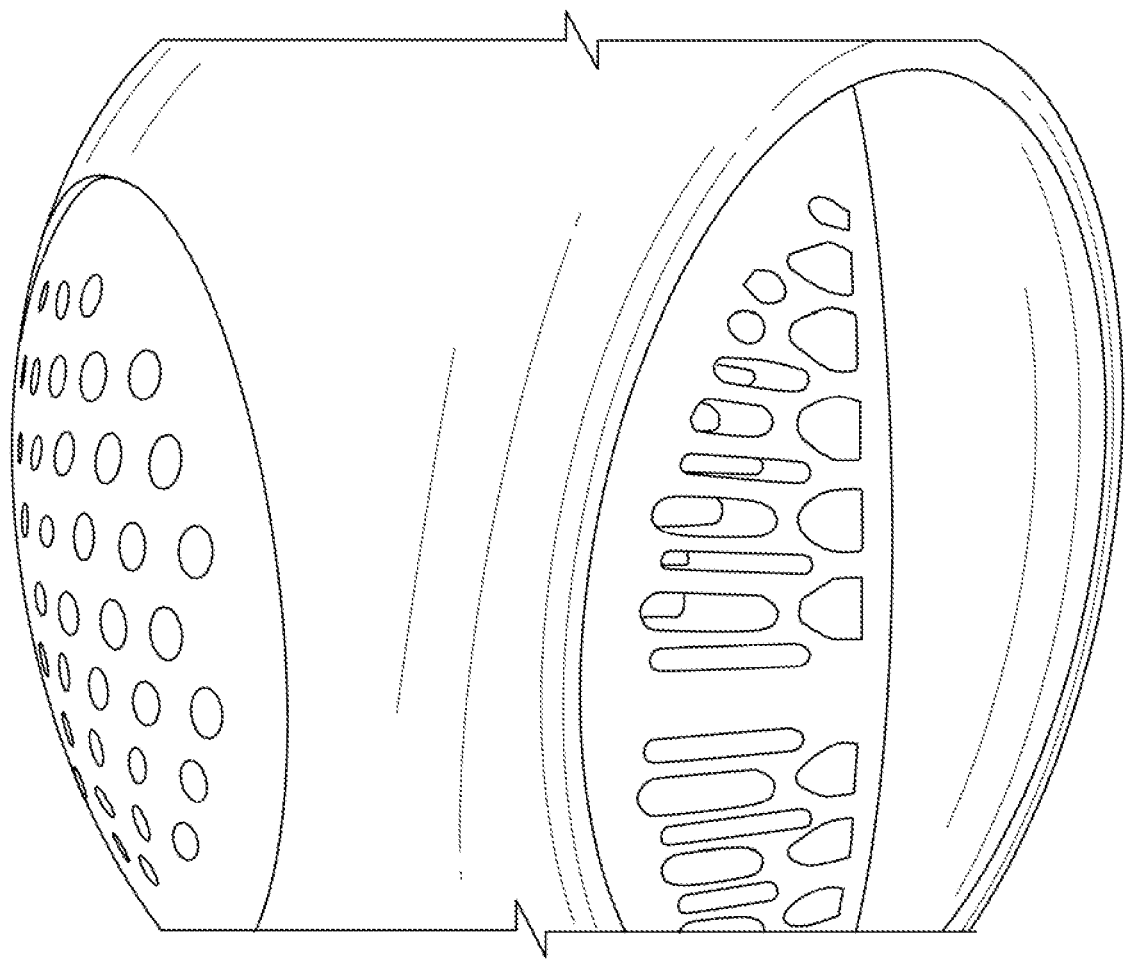
FIG. 7 is a close-up view of an embodiment of the ball valve for the PRCV of the present disclosure.
Figure 10:
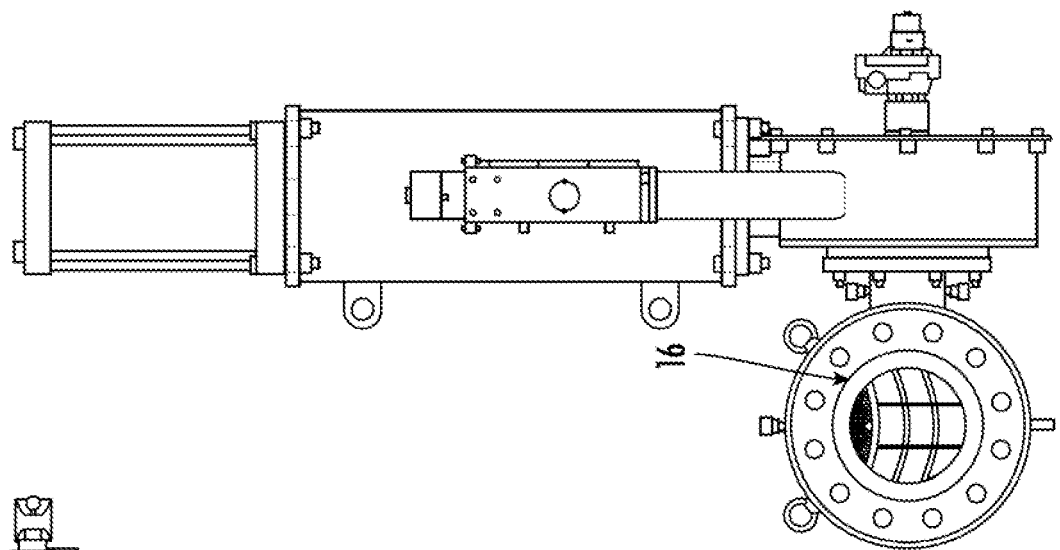
FIG. 10 is a right-side view of the assembly of FIG. 8.
Figure 9:
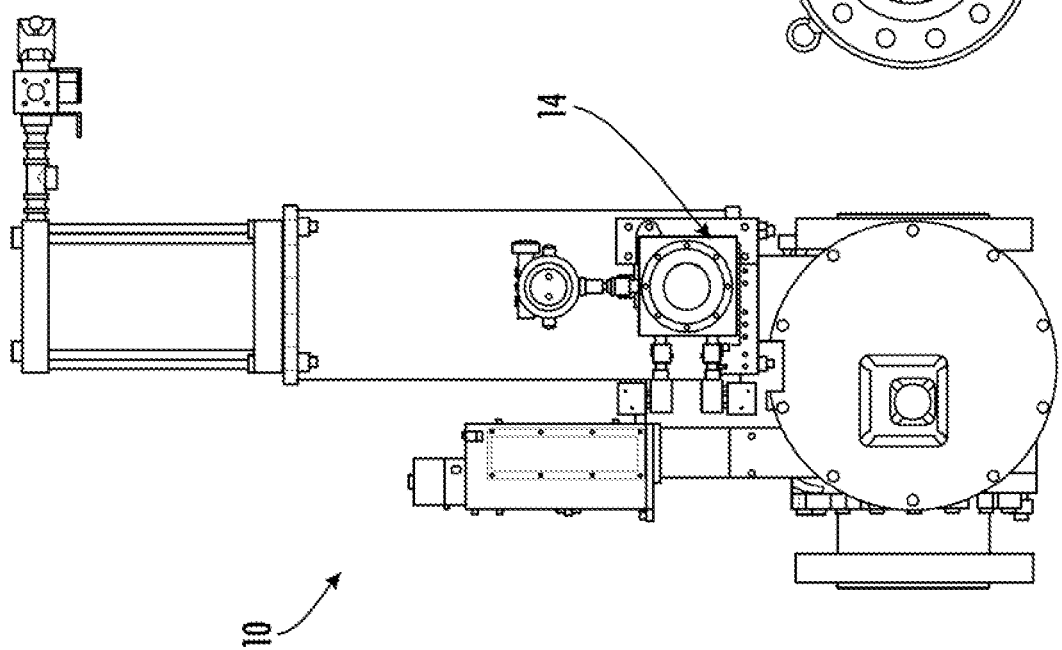
FIG. 9 is a front view of the assembly of FIG. 8.
Figure 8:
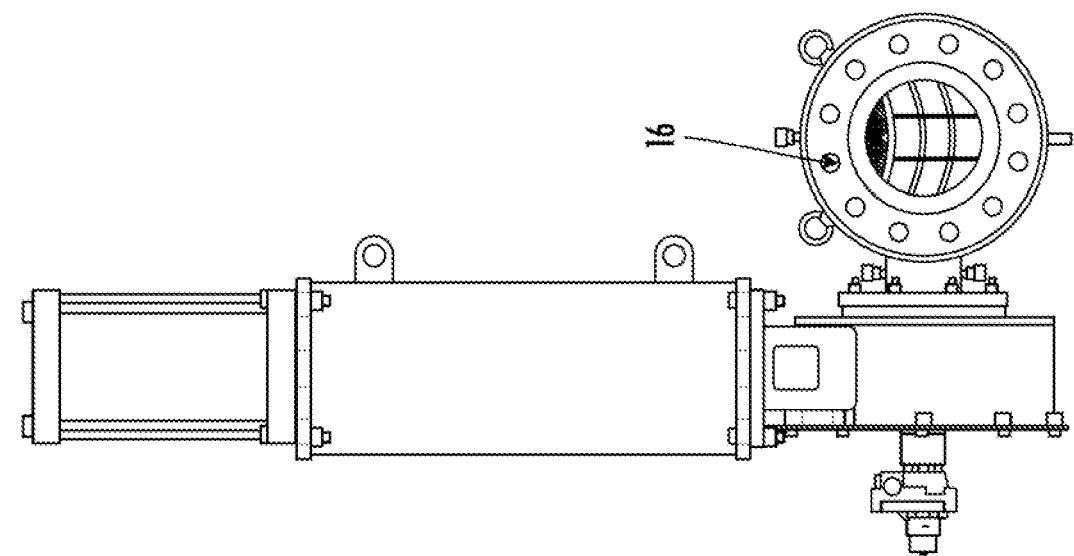
FIG. 8 is a left-side view of the PRCV, attached actuator and anti-surge recycle valve system of FIG. 3.
Figure 11:
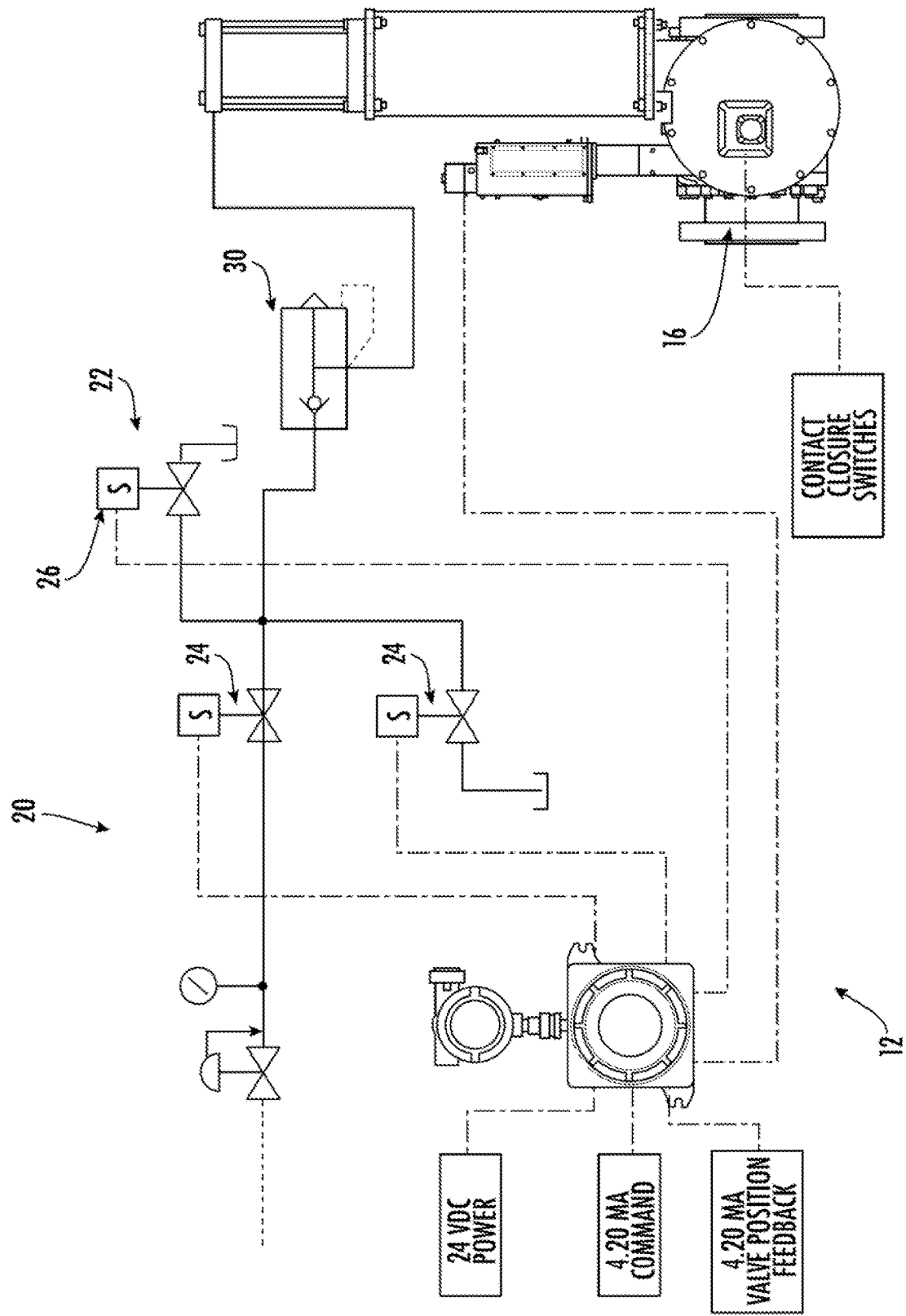
FIG. 11 is a schematic showing the control loops of an embodiment of the presently disclosed anti-surge recycle valve assembly.

Additionally, the system 12 utilizes a Red Circle Valve Controller (RCVC) 14, as shown in FIGS. 3 and 11. The following TABLE II lists specifications for a preferred RCVC 14.

TABLE II

| | |
|---|---|
| Model | RCVC Red Circle Valve Controller |
| Installation | Valve Mount or Remote Installation |
| Diagnostics | Onboard Graphical Performance evaluation |
| Display | High-Resolution, Programmable, Multi-Color Display |
| Command Signal | 4-20 mA Analog or 24 VDC Discrete Pulse |
| Feedback Signal | 4-20 mA (Internal or External Loop Power) Remote/Local Trigger Counter Digital Feedback |
| Deadband | Adjustable 0.1% to 2.0% Travel, Typically Set 0.5% Standard |
| Hysteresis | 0.5% Full Scale (with standard Rotary Position Feedback Module) |
| Linearity | 0.5% Full Scale (with standard Rotary Position Feedback Module) |
| Failure Mode | OPEN, CLOSE, or LOCK on Loss Command Signal |
| Consumption | ZERO STEADY-STATE Bleed to Pressure System Capable |
| Rating | Explosion Proof, Class 1, Div. 1 |
| Connections | ½ FNPT Pneumatic Connections Port ¾ FNPT Electrical Connections |
| Temperature | −20° F. to 120° F. (−29° C. to 49° C.) |
| Compatibility | Dimensions, Ports, Connections 100% Compatible with Existing GE/Becker DNGP Replacement |
| Communication | HART Protocol Compliant, USB Computer Interface |
| Manual Override | Local Manual Valve Positioning Onboard |
| Adjustment | Non-Intrusive Local Thumbwheel Adjustment |
| Area Classification | Class 1, Div. 1 EXPLOSION PROOF |

Referring to FIGS. 3-10, there is illustrated a pipeline rotary control valve 16 (also see '060 patent) including an anti-surge recycle valve assembly 12 for a natural gas system, including embodiments of the required components. The disclosed anti-surge recycle valve assembly 12 is a dual-mode or dual-loop system (i.e., standard response loop 20 and rapid response loop 22) which provides ultra-rapid stroking speed in tandem with highly accurate and stable positioning. The first (or standard response) loop 20 is comprised of two standard response solenoid valves 24, while the second (or rapid response) loop 22 includes a rapid response solenoid valve 26.

Figure 12:
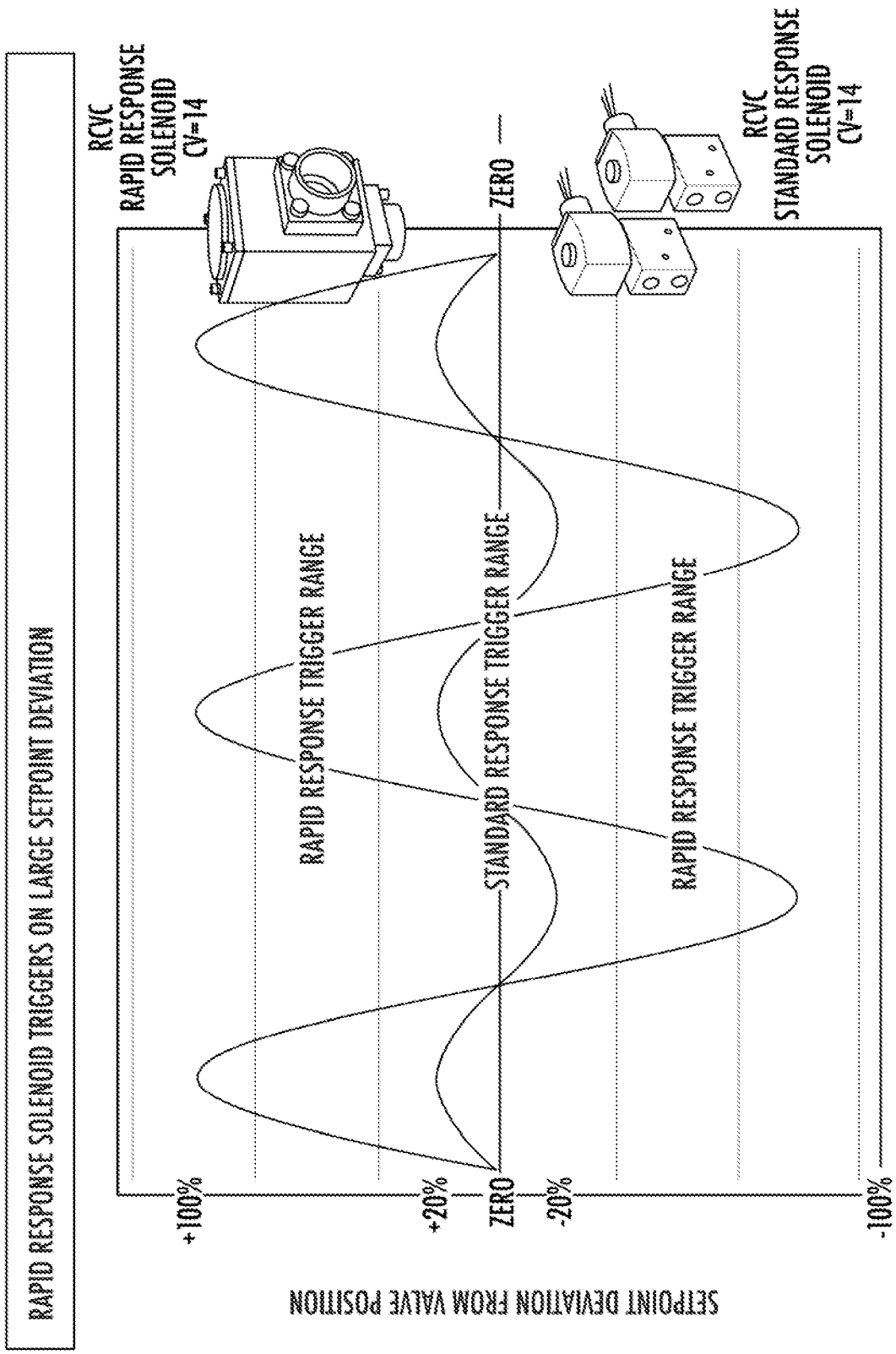
FIG. 12 is a graph of the set-point deviation for the rapid response and standard response solenoids used in the disclosed anti-surge recycle valve assembly.

As indicated in FIGS. 11 and 12, the first loop 20 operates the standard response solenoid valves 24 when the setpoint deviation is less than an adjustable threshold value from the valve position. In a preferred embodiment, +/−20% is the preset threshold, though other threshold percentages may be suitable for specific applications. In the preferred system 10, a deviation of less than 20% is considered steady state operation but exceeding the threshold limit activates the second (i.e., rapid response) control loop 22. The first and second control loops, 20 and 22 respectively, utilizes a Red Circle Valve Controller (RCVC) with a surge-programmable feature. The surge programmable feature allows activation of the second high-speed loop via rapid response solenoid 26, which moves the rotary control valve 16 very rapidly until the difference between the input signal (e.g., setpoint pressure) and the output signal (e.g., output pressure) falls within the acceptable value—e.g., less than 20% deviation (see FIG. 11). As a result, the disclosed system eliminates the need for using a bleed gas in steady state.

Figure 13:
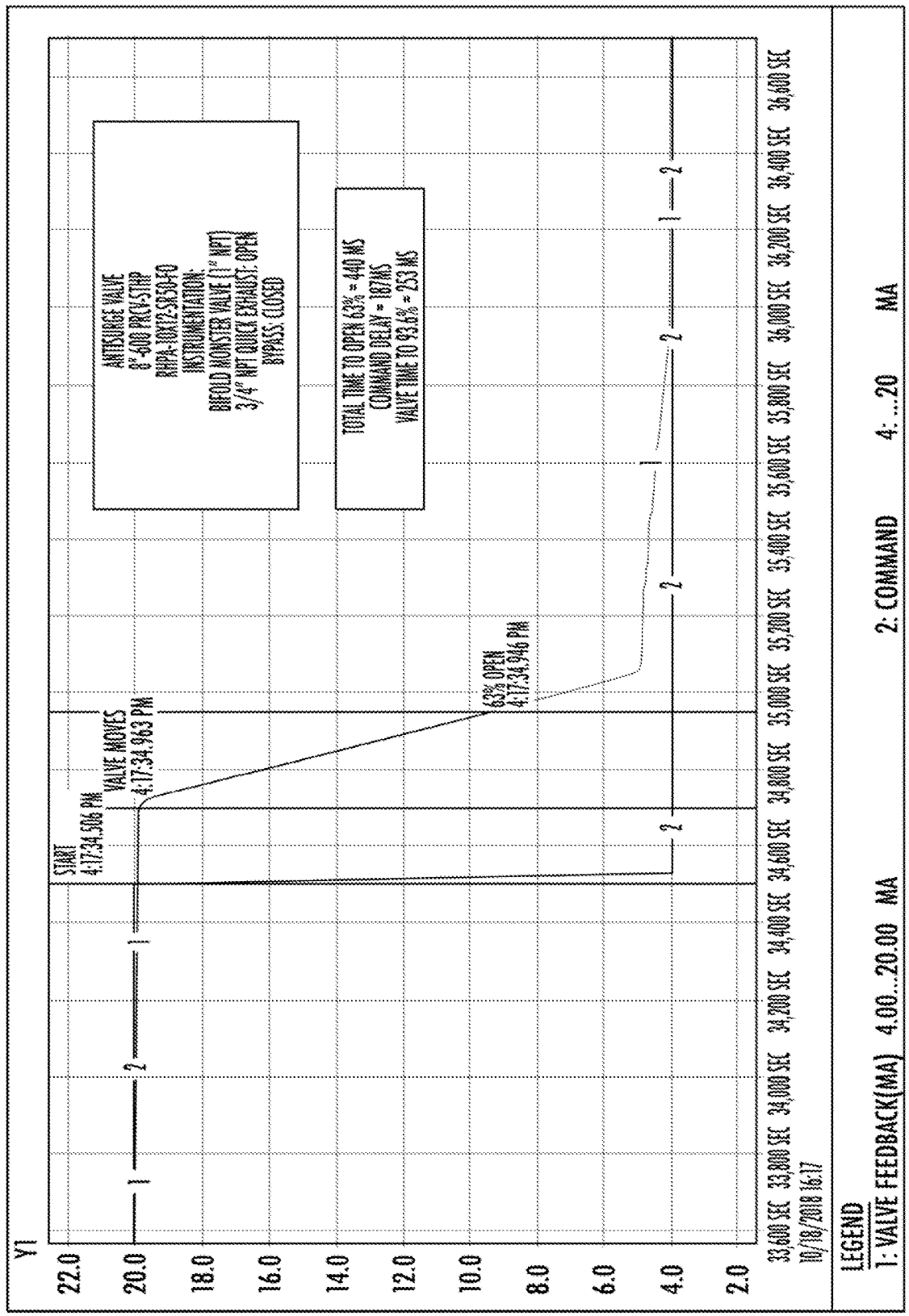
FIG. 13 is a time-line performance graph for the anti-surge valve to open on command when the exhaust valve is open and bypass valve is closed.
Figure 14:
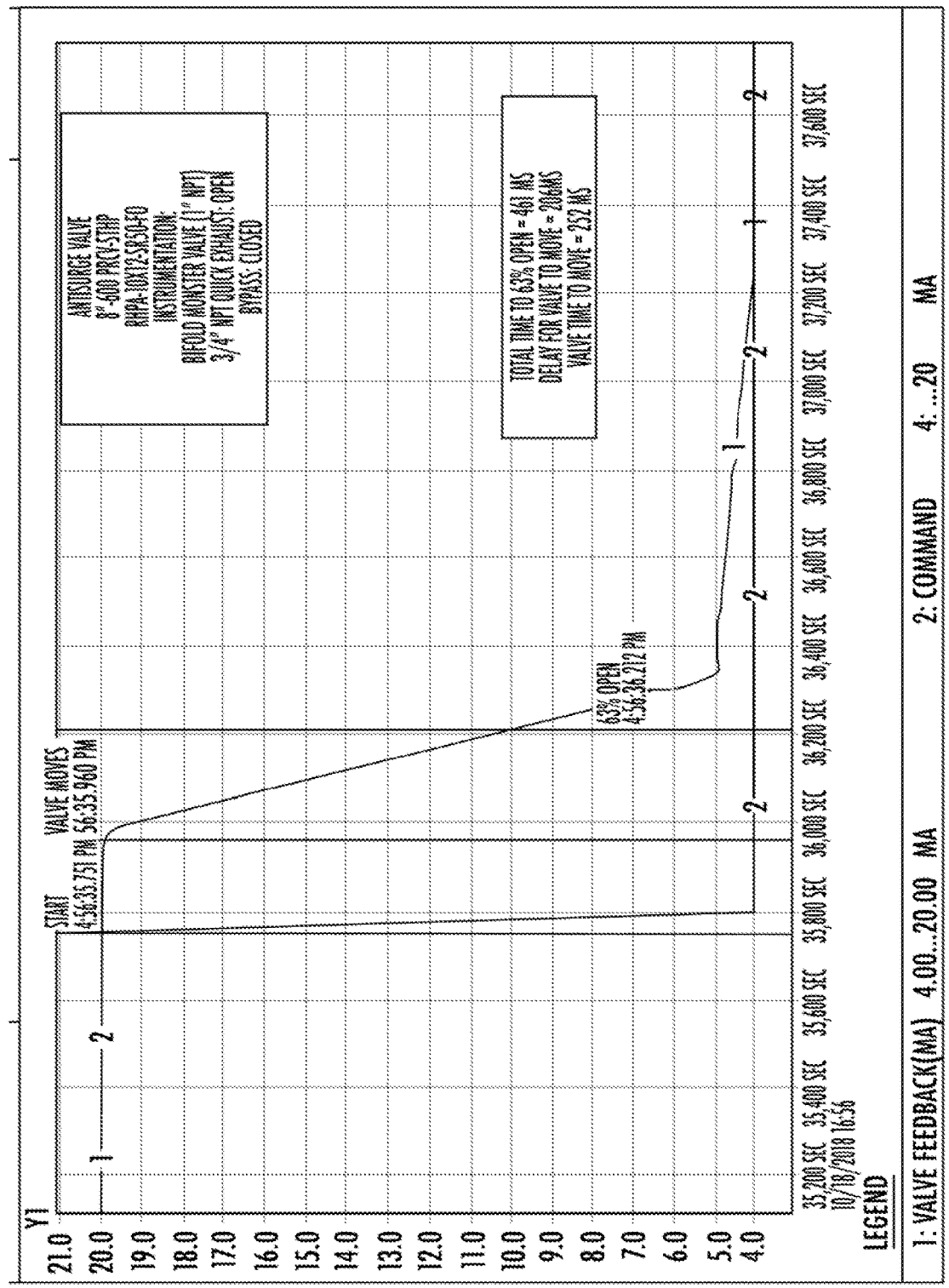
FIG. 14 is a time-line performance graph for the anti-surge valve to open on command when the exhaust valve and bypass valve are closed.
Figure 15:
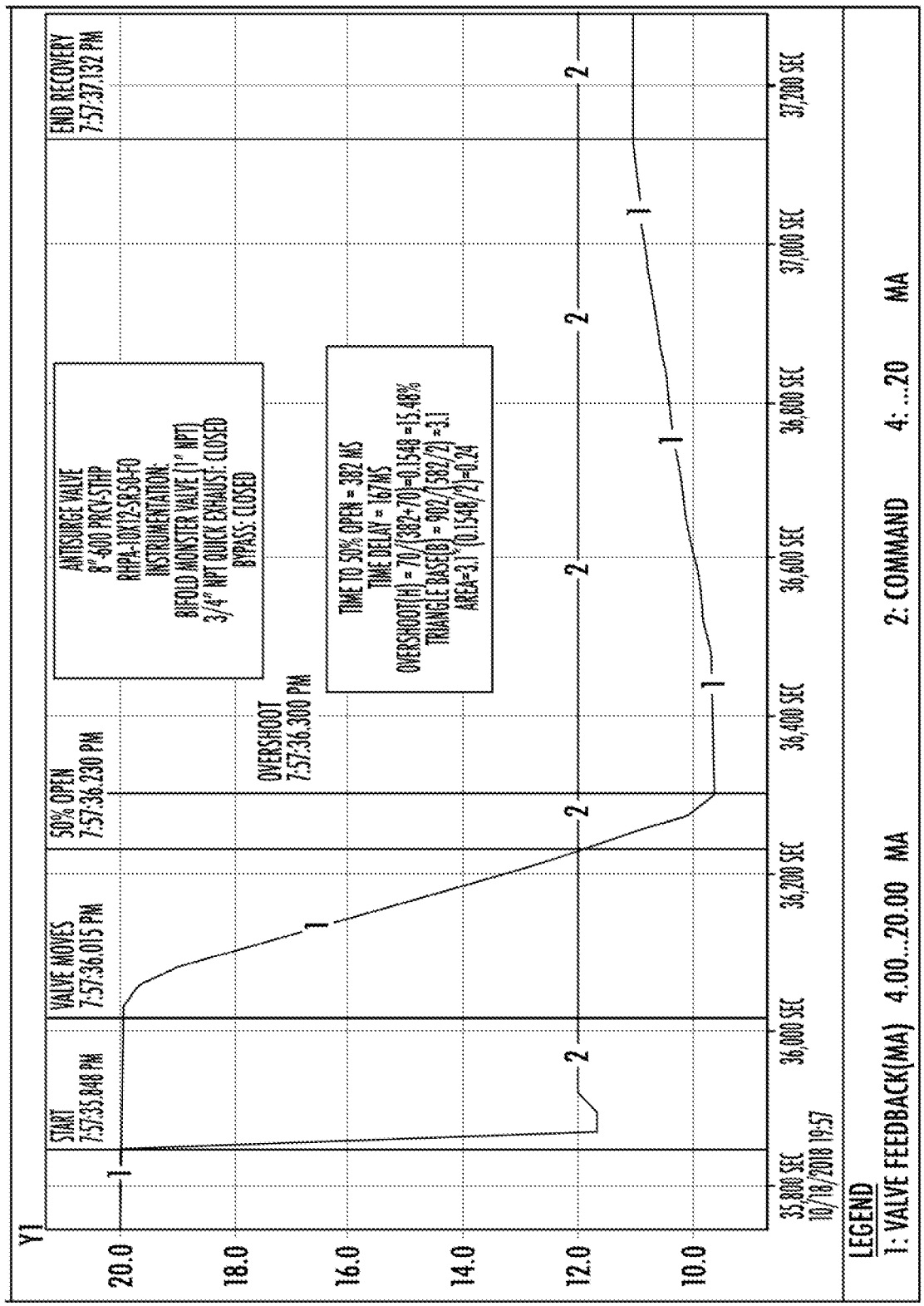
FIG. 15 is a time-line performance graph for the anti-surge valve to open at 50% on command when the bypass valve is closed.
Figure 16:
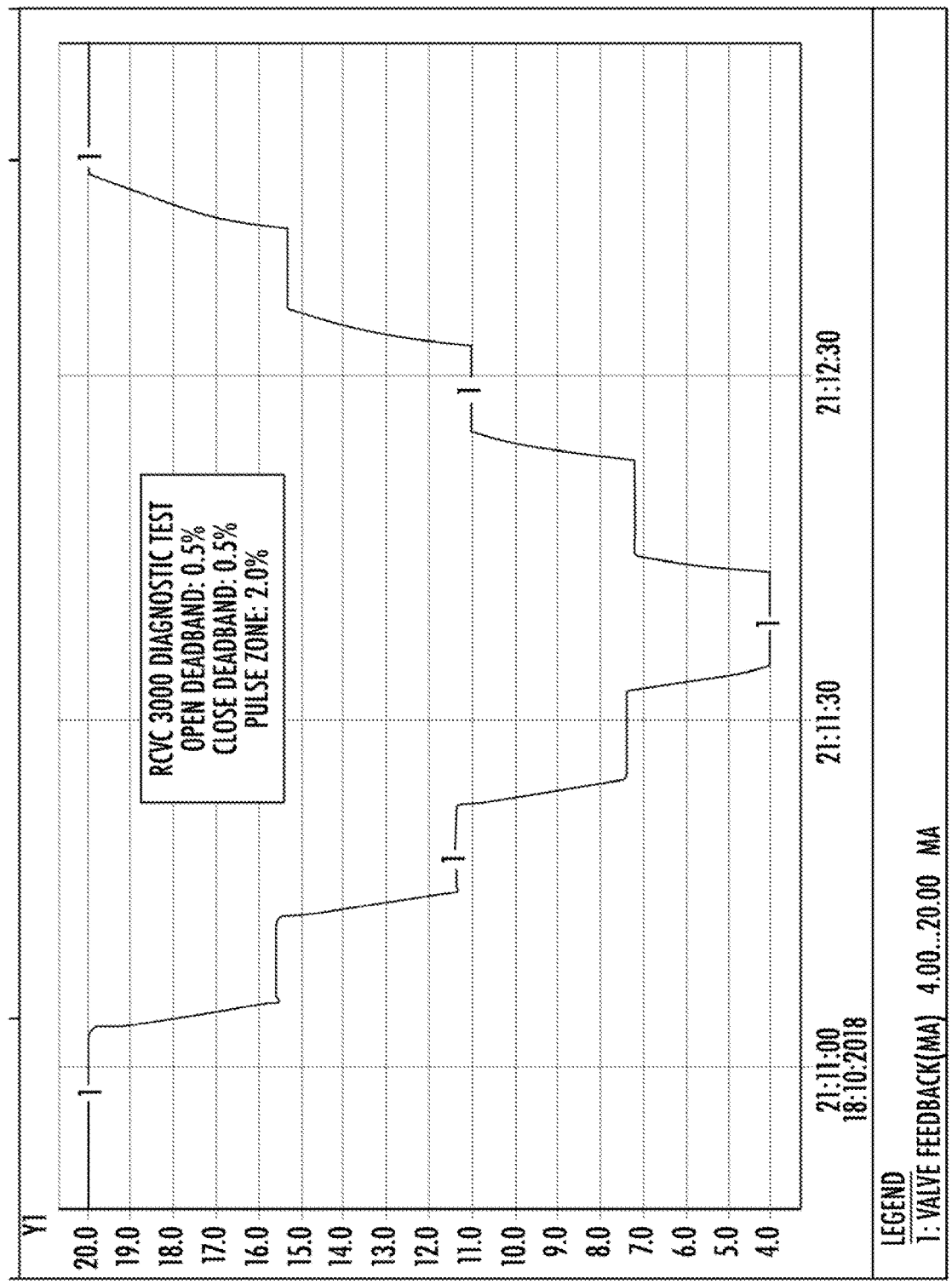
FIG. 16 is a graph of a diagnostic test on the anti-surge recycle valve of the present disclosure.

As shown in FIGS. 13-15, rotary valve response (line 1) to a signal command (line 2) is charted to demonstrate the rapid response and recovery of an embodiment of the disclosed system. In NG. 13, the quick exhaust valve 30 (FIG. 10) is open, while in FIG. 14 the valve 30 is closed. In both scenarios, the response time was less than 500 milliseconds to move the valve to 63% open, including response delay. This response time is related to the valve size, whereas a smaller valve will have a shorter response time and a larger valve will have a longer response time. However, in all scenarios the response time will be much less than FIG. 15 illustrates recovery of the rotary valve 16 after a 50% overshoot. FIG. 16 illustrates valve feedback in a diagnostic test of the valve controller 14.

Figure 17:
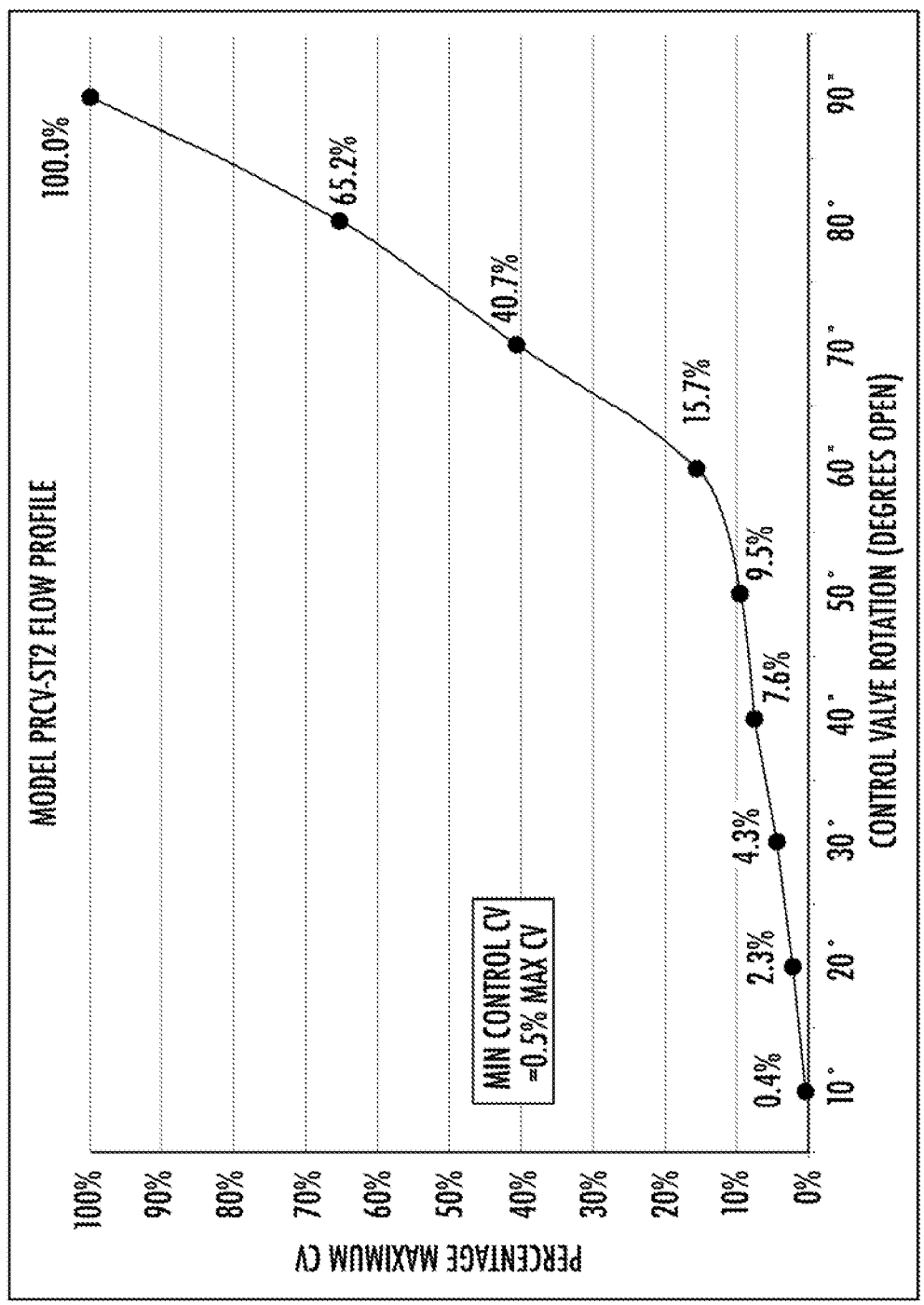
FIG. 17 is graph showing a flow profile for an embodiment of a rotary control valve.

FIG. 17 illustrates a flow profile for a preferred embodiment of the pipeline rotary control valve 16 in 10° increments between 0° (fully closed position) to 90° (fully open position).

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An anti-surge recycle valve system for a natural gas line, the anti-surge recycle valve system comprising:
   a pipeline rotary control valve for controlling gas flow through a gas line and movable from a completely open position through partially open positions to a completely closed position;
   a rotary high-pressure piston actuator for moving the pipeline rotary control valve;
   a linear position sensor for determining a position of the pipeline rotary control valve;
   a valve controller having a surge-programmable feature including a threshold setpoint deviation limit, the valve controller controlling;
   a first solenoid valve loop which drives the rotary high-pressure piston actuator when the linear position sensor determines a setpoint deviation in gas flow below the threshold setpoint deviation limit; and
   a second solenoid valve loop which drives the rotary high-pressure piston actuator when the linear position sensor determines a setpoint deviation in gas flow above the threshold setpoint deviation limit.

2. The anti-surge recycle valve system of claim 1, further comprising a valve manual override.

3. The anti-surge recycle valve system of claim 1, wherein the threshold setpoint deviation limit is adjustable.

4. The anti-surge recycle valve of claim 3, wherein the threshold setpoint deviation limit comprises a +/−20% deviation.

5. The anti-surge recycle valve system of claim 1, wherein the first solenoid valve loop comprises a pair of standard response solenoid valves and the second solenoid valve loop comprises a rapid-response solenoid valve.

6. The anti-surge recycle valve system of claim 5, wherein the rapid-response solenoid valve is configured to utilize natural gas.

7. The anti-surge recycle valve system of claim 5, wherein the rapid-response solenoid valve is configured to support elevated pressures of up to 150 psi.

8. The anti-surge recycle valve system of claim 5, wherein the rapid-response solenoid valve is configured to open in less than 500 milliseconds.

9. The anti-surge recycle valve system of claim 5, wherein the pair of standard-response solenoid valves are configured to operate during steady state.

10. The anti-surge recycle valve system of claim 5, wherein the pair of standard-response solenoid valves are configured to exhibit zero fugitive emissions during steady state.

11. The anti-surge recycle valve system of claim 10, further comprising a valve status monitor.

12. A surge control valve system for a centrifugal compressor in a fluid delivery line, the surge control valve system comprising:

a first control loop; and a second control loop, wherein both the first and second control loops utilize a Red Circle Valve Controller digital positioner with a surge-programmable feature, the second control loop including a high-speed solenoid which is activated by the surge-programmable feature of the Red Circle Valve Controller digital positioner to move a control valve very rapidly until a measured difference between an input signal and an output signal falls within an acceptable value, and wherein use of a bleed gas in steady state is eliminated.

13. The surge control valve system of claim 12, wherein the first control loop operates during steady state.

14. The surge control valve system of claim 12, wherein the second control loop is utilized when the measured difference between the input signal and the output signal is above a threshold limit.

15. The surge control valve system of claim 12, wherein the threshold limit is adjustable.

16. The surge control valve system of claim 15, wherein the threshold limit comprises a +/−20% deviation in the measured difference between the input signal and the output signal.

* * * * *